(12) United States Patent
Mengotti

(10) Patent No.: US 12,404,046 B2
(45) Date of Patent: Sep. 2, 2025

(54) SERIES OF CONVERTIBLE AIRCRAFT CAPABLE OF HOVERING AND METHOD FOR CONFIGURING A CONVERTIBLE AIRCRAFT CAPABLE OF HOVERING

(71) Applicant: LEONARDO S.P.A., Rome (IT)

(72) Inventor: Riccardo Bianco Mengotti, Samarate (IT)

(73) Assignee: LEONARDO S.P.A., Rome (IT)

( * ) Notice: Subject to any disclaimer, the term of this patent is extended or adjusted under 35 U.S.C. 154(b) by 6 days.

(21) Appl. No.: 18/568,384

(22) PCT Filed: May 24, 2022

(86) PCT No.: PCT/IB2022/054836
§ 371 (c)(1),
(2) Date: Dec. 8, 2023

(87) PCT Pub. No.: WO2022/263949
PCT Pub. Date: Dec. 22, 2022

(65) Prior Publication Data
US 2024/0270415 A1    Aug. 15, 2024

(30) Foreign Application Priority Data
Jun. 18, 2021 (EP) .................................. 21180435

(51) Int. Cl.
*B64U 10/20* (2023.01)
*B64U 20/40* (2023.01)
(Continued)

(52) U.S. Cl.
CPC ............. *B64U 10/20* (2023.01); *B64U 20/40* (2023.01); *B64U 50/19* (2023.01); *B64U 2101/61* (2023.01); *B64U 2101/64* (2023.01)

(58) Field of Classification Search
CPC ........ B64U 10/20; B64U 20/40; B64U 30/14; B64U 50/19; B64U 2101/64;
(Continued)

(56) References Cited

U.S. PATENT DOCUMENTS 10,011,349 B2    7/2018  Ivans et al.
10,941,707 B1 *  3/2021  Berkey .................. H02K 7/108
(Continued)

FOREIGN PATENT DOCUMENTS

EP    0798207    10/1997
EP    3470332    4/2019
(Continued)

OTHER PUBLICATIONS

International Search Report and Written Opinion in PCT Application No. PCT/IB2022/054836, mailed Sep. 16, 2022 (15 pages).

*Primary Examiner* — Rodney A Bonnette
(74) *Attorney, Agent, or Firm* — Leason Ellis LLP

(57) ABSTRACT

A series of convertible aircraft with a core with an airframe defining a first axis is described; a first, a second, a third, a fourth, a fifth and a sixth rotor which are rotatable about respective first, second, third, fourth, fifth and sixth axis, and operable independently of each other so as to generate respectively a first, a second, a third, a fourth, a fifth and a sixth thrust value independent of each other; the core comprises first and second portions of respective half-wings and aerodynamic surfaces and each module comprises third and fourth portions of respective half-wings and aerodynamic surfaces.

14 Claims, 10 Drawing Sheets

(51) Int. Cl.
*B64U 50/19* (2023.01)
*B64U 101/61* (2023.01)
*B64U 101/64* (2023.01)

(58) Field of Classification Search
CPC . B64U 2101/61; B64C 27/28; B64C 29/0025; B64C 29/0033
See application file for complete search history.

(56) References Cited

U.S. PATENT DOCUMENTS

| | | |
|---|---|---|
| 2009/0166477 A1 | 7/2009 | Bousfield |
| 2014/0231593 A1* | 8/2014 | Karem .................. B64C 1/0009 244/45 R |
| 2016/0236775 A1 | 8/2016 | Eshkenazy et al. |
| 2021/0047029 A1* | 2/2021 | Stanney .............. B64C 29/0033 |
| 2021/0114723 A1* | 4/2021 | Wittmaak, Jr. ...... B64U 30/297 |
| 2022/0041275 A1* | 2/2022 | Tian ....................... B64U 50/13 |
| 2022/0119090 A1* | 4/2022 | Minarik ................. B64U 10/20 |
| 2024/0270378 A1* | 8/2024 | Bianco Mengotti .... B64C 27/28 |

FOREIGN PATENT DOCUMENTS

| | | |
|---|---|---|
| EP | 3656669 | 5/2020 |
| EP | 3667875 | 6/2020 |
| WO | 2018209911 | 11/2018 |
| WO | 2020105045 | 5/2020 |

\* cited by examiner

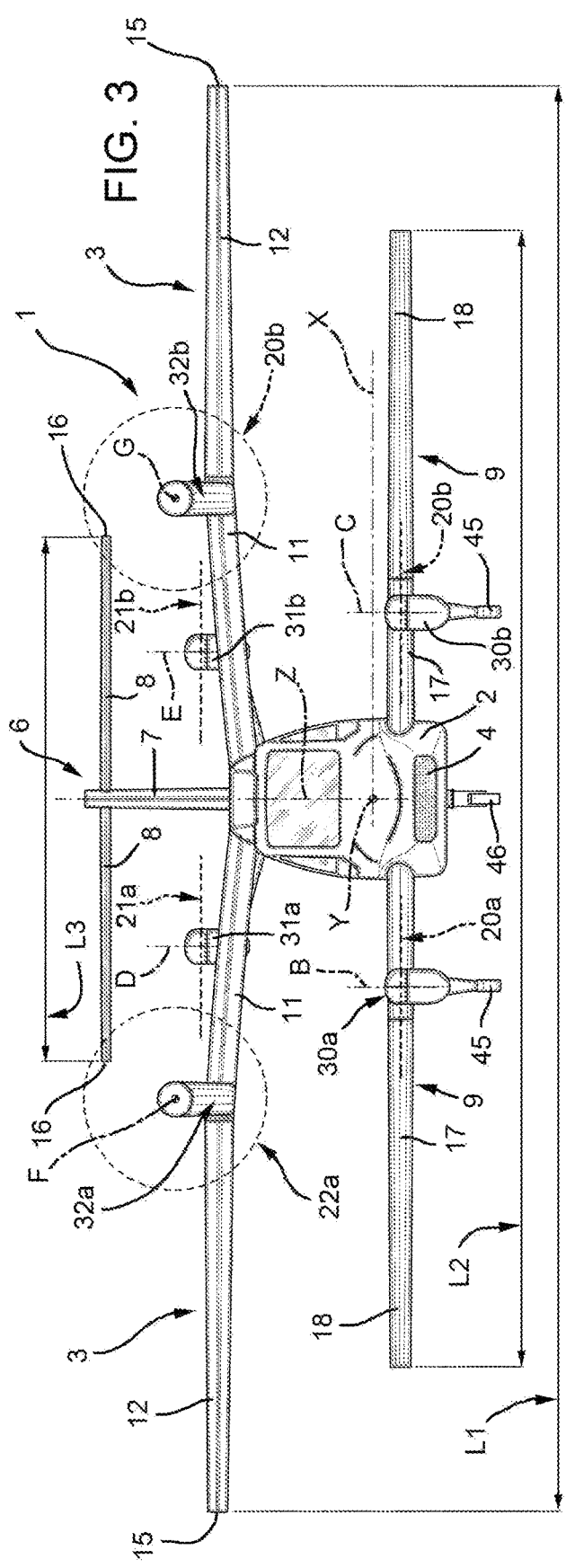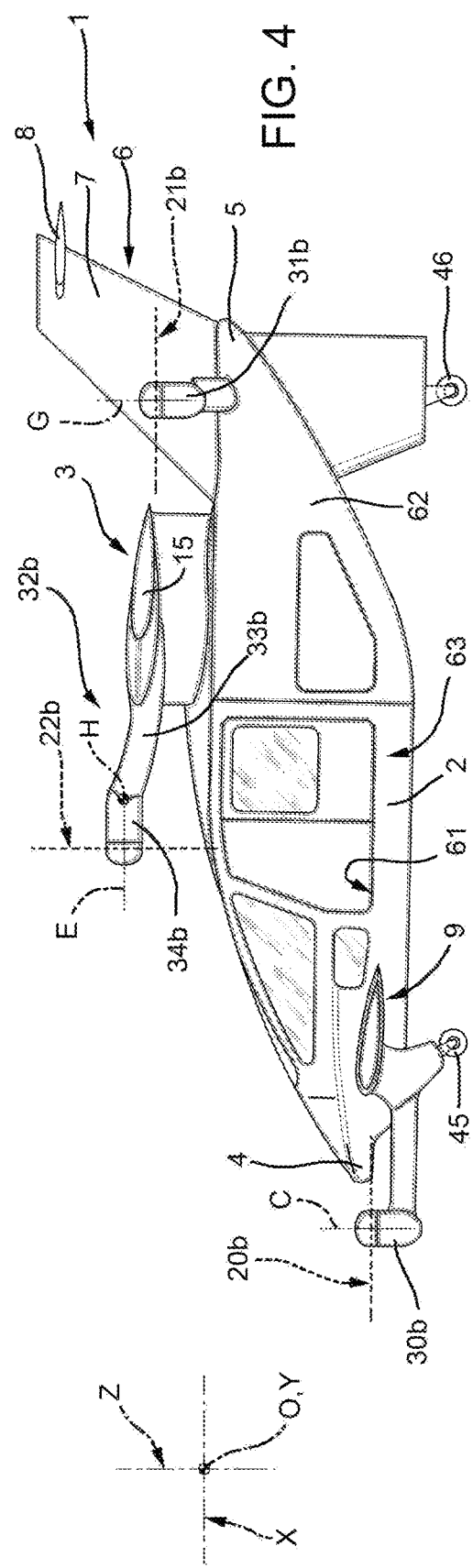

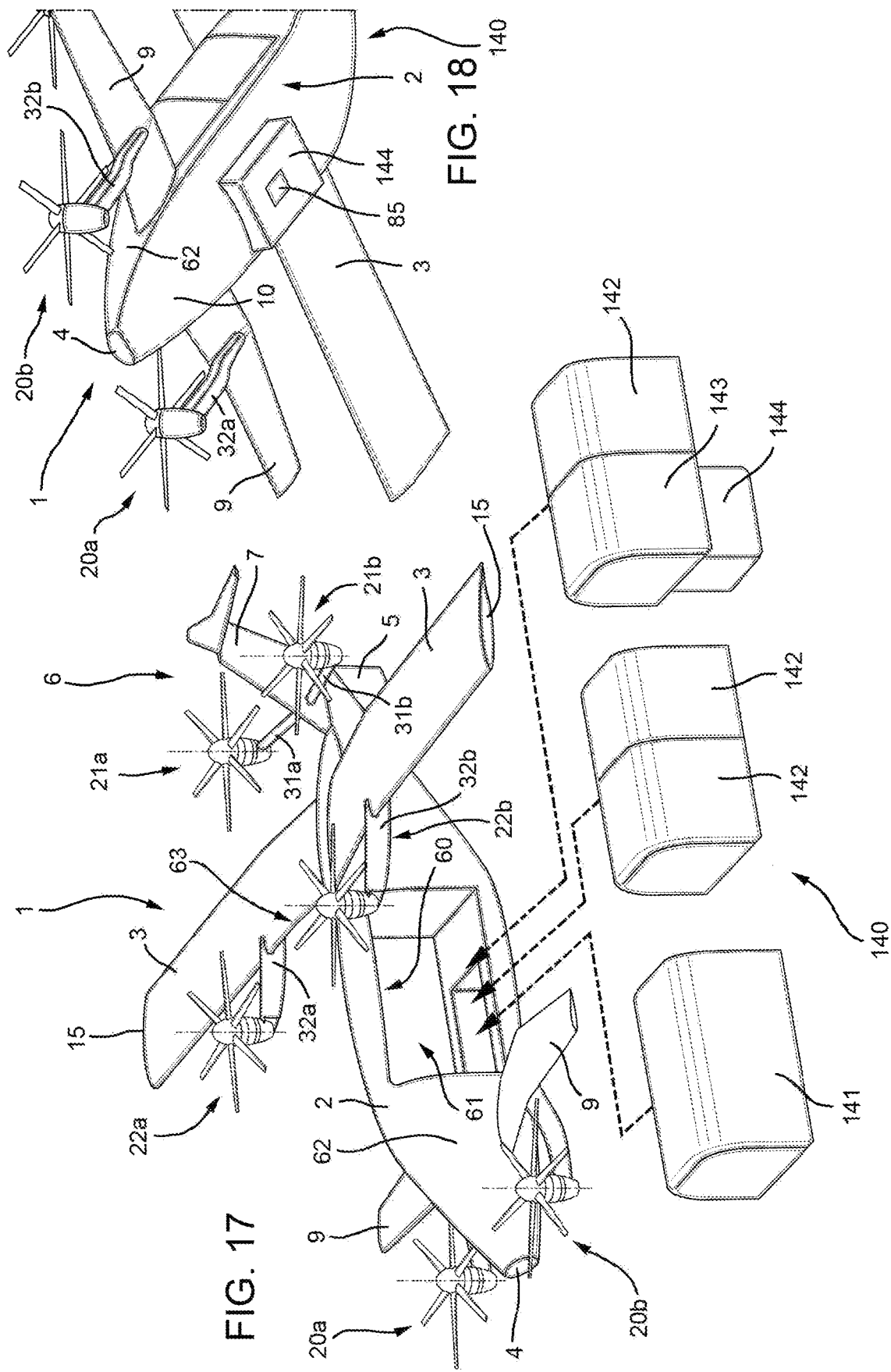

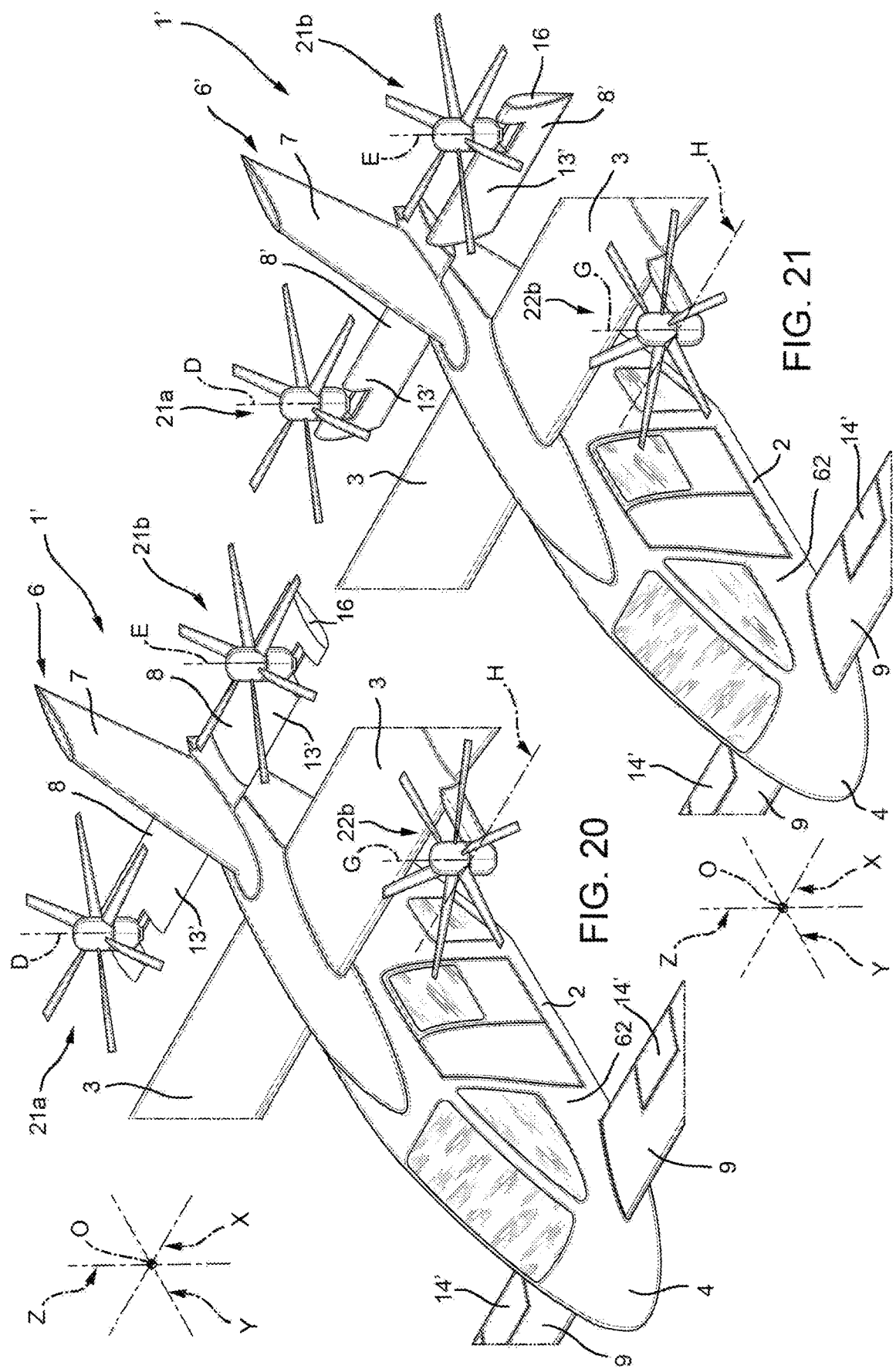

SERIES OF CONVERTIBLE AIRCRAFT CAPABLE OF HOVERING AND METHOD FOR CONFIGURING A CONVERTIBLE AIRCRAFT CAPABLE OF HOVERING

CROSS-REFERENCE TO RELATED APPLICATIONS

This patent application a U.S. National Phase Application under 35 U.S.C. § 371 of International Patent Application No. PCT/IB2022/054836, filed on May 24, 2022, which claims priority from Italian Patent Application No. 21180435.6, filed on Jun. 18, 2021, all of which are incorporated by reference, as if expressly set forth in their respective entireties herein.

TECHNICAL FIELD OF THE INVENTION

The present invention relates to a series of aircraft that are convertible between a first configuration of hovering flight or of flight along a predominantly vertical trajectory and a second forward flight or cruise configuration.

The present invention also relates to a method for configuring a convertible aircraft.

STATE OF THE ART

In the aviation sector, aeroplanes are normally used for high cruising speeds, in particular greater than 150 knots and high altitudes, e.g. above 30,000 feet. At cruising speeds and high altitudes, aeroplanes use fixed wings to generate the lift necessary to sustain the plane. A sufficient value of this lift can only be obtained by accelerating the aeroplane on runways of considerable length. These runways are also necessary to allow the same aeroplanes to land.

In contrast, helicopters normally have lower cruising speeds than aeroplanes and generate the necessary lift for sustenance through the rotation of the main rotor blades. As a result, helicopters can land/take off without the need for a horizontal speed and using particularly small surfaces. Moreover, helicopters are able to hover and to fly at relatively low altitudes and speeds, resulting thus as particularly manoeuvrable and suitable for demanding manoeuvres such as rescuing people in the mountains or at sea.

Nevertheless, helicopters have inherent limitations in terms of maximum operational altitude, which is around 20000 feet, and maximum operational speed, which cannot exceed 150 knots.

In order to meet the demand for aircraft that have the same maneuverability and flexibility of use as the helicopter and at the same time overcome the inherent limitations mentioned above, convertiplanes are known and which constitute a type of convertible aircraft.

An example of a convertiplane is described in patent application U.S. Pat. No. 10,011,349.

In more detail, the convertiplane described in the aforesaid application essentially comprises:
a fuselage extending along a first longitudinal axis; and
a pair of half-wings projecting cantilevered from respective parts of the fuselage that are opposite to each other, and having respective free ends opposite to the fuselage and aligned along a second transverse axis that is substantially orthogonal to the first longitudinal axis.

The convertiplane further comprises:
a pair of nacelles housing the respective motors; and
a pair of rotors that are rotatable around respective third axes and operatively connected to respective motors.

The rotors can be inclined relative to the wing around a fourth axis, preferably parallel to the second axis.

The convertiplanes are also able to selectively assume:
the first "helicopter" configuration, wherein the rotors are arranged with the respective third axes that are substantially vertical and orthogonal to the first axis of the convertiplane and orthogonal to the respective motors; or
the second "aeroplane" configuration, wherein the rotors are arranged with respective third axes that are substantially parallel to the first axis of the same convertiplane and coaxial to the respective engines.

Recently, several proposals for convertible aircraft with electric propulsion have been developed.

Among them, patent application WO-A-2020/105045 describes a convertible aircraft comprising essentially:
an airframe elongated according to a longitudinal direction of the aircraft;
a pair of half-wings projecting cantilevered from respective sides of the airframe; and
a portion of the tail formed by two aerodynamic surfaces forming a V.

The aircraft described in WO-A-2020/105045 further comprises:
two pairs of first rotors with axis fixed with respect to the airframe and which are arranged so as to form a polygon surrounding the centre of gravity of the aircraft;
two pairs of second rotors with tilting axis with respect to the airframe.

In more detail, the first rotors and second rotors are controllable independently of each other so as to provide respective first and second thrusts that can be adjusted independently of each other.

A pair of second rotors is arranged at free ends of respective half-wings while the other pair of second rotors is arranged at free ends of respective aerodynamic surfaces of the tail portion.

The second rotors are inclinable between a first position wherein the respective second axes are arranged orthogonal to the longitudinal direction of the aircraft and provide a vertical thrust, and a second position wherein respective second axes are arranged parallel to the longitudinal direction of the aircraft and provide a thrust parallel to the forward direction of the aircraft.

Consequently, the aircraft can selectively assume:
the first configuration, wherein the second rotors are arranged in the first position and cooperate with the first rotors to provide the vertical thrust necessary to sustain the aircraft; and
the second configuration, wherein the second rotors are arranged in the second position and provide the horizontal thrust necessary to move the aircraft forward, while the first rotors and half-wings provide the vertical thrust necessary to sustain the aircraft.

The need is felt in the sector to realize a convertible aircraft capable of being reconfigured simply and with as few operations as possible, so as to be able to carry out long distance missions or to be able to reduce consumption or to be able to achieve high performance flight.

US-A-2016/236775 discloses a vertical takeoff and landing aircraft. The latter includes an airframe with a wing having an airfoil, the airfoil having an airfoil chord line and the wing having a wingspan. The aircraft further includes at least one forward thrust rotor having a horizontal thrust offset angle defined between the airfoil chord line and an axis of rotation of the forward thrust rotor. The aircraft further includes a plurality of vertical thrust rotors, each of the plurality of vertical thrust rotors having a vertical thrust offset angle defined between the airfoil chord line and a plane of rotation of the vertical thrust rotor. The vertical thrust offset angle is between 3 degrees and 10 degrees. The axis of rotation of the forward thrust rotor and planes of rotation of the plurality of vertical thrust rotors define a plurality of relative thrust angles that are each less than the horizontal thrust offset angle.

EP-A-3470332 discloses a multirotor aircraft with an airframe and at least one wing that is mounted to the airframe, the at least one wing being provided with at least four thrust producing units that are arranged in spanwise direction of the at least one wing, wherein each one of the at least four thrust producing units comprises at least one rotor assembly that is accommodated in an associated shrouding, the associated shrouding being integrated into the at least one wing. The shrouding defines an air duct that is axially delimited by an air inlet region and an air outlet region, wherein the air inlet region exhibits in circumferential direction of the air duct at least two different aerodynamic profiles.

EP-A-3667875 discloses a converter and a circuit device including the converter are disclosed. The converter includes an inductor including a first end and a second end, and a switching circuit connected to the inductor. The switching circuit includes a first switch to control a connection between the first end and a battery connected to the converter, a second switch to control a connection between the second end and a current output end configured to output a current generated through the inductor from the battery, a third switch to control a connection between the second end and a voltage output end configured to output a voltage generated from the battery, and a fourth switch to control a connection between the second end and a voltage input end configured to receive a voltage to charge the battery.

EP-A-3656669 discloses a vertical take-off and landing multirotor aircraft with an airframe and at least eight thrust producing units, each one of the at least eight thrust producing units being provided for producing thrust in an associated predetermined thrust direction, wherein at least four thrust producing units of the at least eight thrust producing units form a first thrust producing units sub-assembly, and at least four other thrust producing units of the at least eight thrust producing units form a second thrust producing units sub-assembly, the first thrust producing units sub-assembly being operable independent of the second thrust producing units sub-assembly.

US-A-2009/166477 discloses a collapsible, nesting wing structure with or without wing warp flight control. US-A-2009/166477 further discloses incorporates means to maintain wing extension during flight, methods of wing construction for nesting collapsible wings, and control surfaces for collapsible wings.

EP-A-798207 disclose several innovative systems for an aircraft, and aircraft incorporating them, are disclosed. Features include inboard-mounted engine(s) with a belt drive system for turning wing-situated propellers; compound landing gear integrating ski pontoon and wheel subcomponents; pivotal mounting armatures for landing gear and/or propellers which provide a plurality of possible landing gear and/or propeller configurations; and a compound wing structure featuring extendable wing panels that permit the wing span of the aircraft to be nearly doubled while in flight. Aircraft incorporating such features will enjoy several safety advantages over conventional multi-engine aircraft and will be capable of modifications during flight which permit landings on any of snow, hard surfaces (runways) and water.

WO-A-2018/209911 discloses a vertical take-off and landing unmanned aerial vehicle having a foldable fixed wing and based on a twin-ducted fan power system. The unmanned aerial vehicle employs a twin-ducted fan power system arranged at a tail portion of a fuselage in a transverse and tail propulsion arrangement to provide lift for vertical take-off and landing and propulsion for horizontal flight. By means of a control servo plane arranged at a duct exit at an angle, a vectored thrust is provided to enable a fast attitude change. A foldable wing configuration is employed for the wing, such that when the aerial vehicle takes off vertically/flies at a low speed, the wing is folded to reduce the frontal area exposure to crosswind, and when the aerial vehicle is flying horizontally, the wing is expanded to obtain larger lift. The ducts and single wing are combined in an optimized manner by arranging the wing to be within a specific duct airflow region, such that the Coanda effect is created at a rear edge of the wing to improve the performance thereof. The aerial vehicle has flight operation in multiple modes, including vertical take-off and landing and high-speed cruising. The VTOL aerial vehicle has superior aerodynamic efficiency during hovering/low-speed flight, is resistant to turbulence during take-off and landing/hovering, and enables low power consumption, low noise, and high safety and reliability.

SUBJECT AND SUMMARY OF THE INVENTION

Aim of the present invention is to realize a series of convertible aircraft which allows to satisfy at least one of the needs specified above in a simple and economical way.

According to the invention, this aim is achieved by a series of convertible aircraft as claimed in claim 1.

The present invention also relates to a method for configuring a convertible aircraft as claimed in claim 14.

BRIEF DESCRIPTION OF THE DRAWINGS

For a better understanding of the present invention, seven preferred non-limiting embodiments are described below, purely by way of example and with the aid of the attached drawings, wherein:

FIG. 3 is a front view of the aircraft of FIGS. 1 and 2 arranged in the second configuration;

FIG. 4 is a side view of the aircraft of FIGS. 1 to 3 arranged in the second configuration;

FIG. 10 shows in perspective view some components of the first architecture of the aircraft in FIG. 9, with parts removed for clarity's sake;

FIG. 14 shows in perspective view some components of the second and third architecture of the aircraft in FIG. 9, with parts removed for clarity's sake;

FIG. 17 shows in perspective view in partially exploded enlarged scale and according to a first viewing angle the fourth architecture of FIG. 16;

FIG. 18 shows in perspective view one with a second viewing angle the fourth architecture of FIGS. 16 and 17;

FIG. 20 is a perspective view of a second embodiment of a convertible aircraft of the series realized according to the dictates of the present invention arranged in the first configuration; and FIG. 21 is a perspective view of the aircraft in FIG. 20 arranged in the second configuration.

DETAILED DESCRIPTION OF PREFERRED EMBODIMENTS OF THE INVENTION

Figure 1:
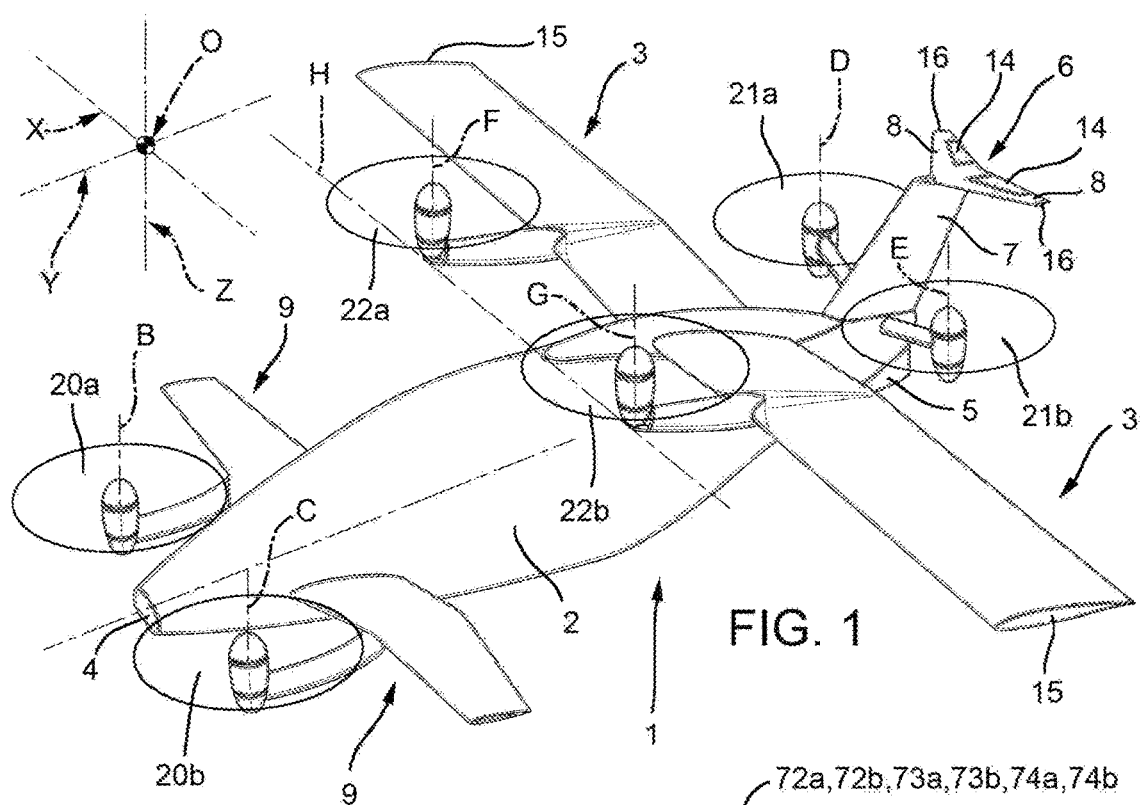
FIG. 1 is a perspective view of a first embodiment of a convertible aircraft of the series realized according to the dictates of the present invention arranged in a first configuration.

With reference to FIGS. 1 to 19, 1 denotes an aircraft capable of hovering.

In more detail, the aircraft 1 is selectively switchable between:

a first configuration (FIG. 1), wherein it performs a hovering manoeuvre or moves forward along a predominantly vertical trajectory; and a second configuration (FIG. 2), wherein it is in a forward flight condition and proceeds along a mainly horizontal trajectory.

It must be specified that in the following present disclosure, expressions such as "upper", "lower", "at the front", "at the back" and the like are used referring to forward flight conditions or "hovering" of the convertiplane 1 shown in FIGS. 1 to 2.

It is possible to identify a triplet of axes integral to the aircraft 1 and originating at a centre of gravity O of the aircraft 1 itself formed by:

a longitudinal axis Y of the same aircraft 1;
an axis X orthogonal to the axis Y; and
an axis Z orthogonal to the axes X, Y.

In a known manner, the rotations of the aircraft 1 around the axes Y, X, Z are associated with the following manoeuvres:

roll, i.e. rotation about the axis Y (FIGS. 6*b* and 6*f*);
pitch, i.e. rotation about the axis X (FIGS. 6*c* and 6*g*);
yaw, i.e. rotation about the axis Z (FIGS. 6*d* and 6*h*).

The aircraft 1 essentially comprises:

an airframe 2 which is elongated along the axis Y and defining a nose 4 and a tail 5 of the aircraft 1;

a pair of half-wings 3 extending cantilevered from respective mutually opposite sidewalls 62 of the airframe 2 and transversely to the axis Y; and a tail portion 6 projecting cantilevered from the tail 5 of the airframe 2 transversely to the airframe 2.

With reference to normal forward flight operating conditions, the aircraft 1 proceeds in a direction that is oriented from tail 5 to nose 4.

The half-wings 3 are intended to provide a first lift value to the aircraft 1 which is adapted to sustain the aircraft 1 arranged in the second configuration.

The half-wings 3 comprise respective free ends 15 opposite the airframe 2.

The half-wings 3 extend superiorly to the airframe 2.

In the case shown, the semi-axes 3 comprise:

respective root portions 11 projecting cantilevered from respective sidewalls 62 of the airframe 2, and diverging from each other proceeding from the airframe 2 towards respective free ends 15; and respective end portions 12 arranged superiorly to the airframe 2, defining the respective ends 15 and substantially parallel to each other.

The tail portion 6 is preferably T-shaped and comprises, in turn:

a fin 7 intended to provide lateral stability to the aircraft 1 arranged in the second configuration; and a couple of aerodynamic surfaces 8 projecting cantilevered from respective mutually opposite sides of the fin 7, comprising respective free ends 16, and adapted to generate a second lift/downforce value to ensure a desired degree of longitudinal stability to the aircraft 1 itself arranged in the second configuration.

Preferably, the aircraft 1 further comprises a pair of canard-type aerodynamic surfaces 9 projecting cantilevered from respective mutually opposite sides of the nose 4 of the airframe 2 and adapted to generate a third lift/downforce value to ensure the desired degree of longitudinal stability to the aircraft 1 itself arranged in the second configuration.

The aerodynamic surfaces 9 comprise, in turn:

respective root portions 17 projecting cantilevered from and connected to respective sidewalls 62 of the airframe 2; and respective end portions 18 arranged on the opposite side of the corresponding root portions 17 with respect to the airframe 2.

In particular, the root 17 and end 18 portions are coplanar with each other.

In the case shown, the wingspan L1 of the half-wings 3 is greater than the wingspan L2 of the aerodynamic surfaces 9.

The wingspan L2 of the aerodynamic surfaces 9 is greater than the wingspan L3 of the aerodynamic surfaces 8.

In the case shown in FIG. 3, the wingspan of the aerodynamic surfaces 8 ranges between 40 and 50% of the wingspan of the aerodynamic surfaces 9.

The wingspan of the aerodynamic surfaces 9 ranges between 70 and 90% of the wingspan of the half-wings 3.

In this description, the term "wingspan" means the distance between opposite free ends 17, 18 of the respective half-wings 3 and aerodynamic surfaces 8, 9.

The aerodynamic surfaces 9 are arranged inferiorly to the half-wings 3. The half-wings 3 are arranged inferiorly to the aerodynamic surfaces 8.

In the shown case, the aerodynamic surfaces 8 comprise respective appendages 14 which are movably connected thereto to adjust the second lift value and to contribute to the control of the aircraft 1.

The aircraft 1 also comprises:

a pair of rotors 20*a*, 20*b* which are rotatable about respective fixed axes B, C with respect to the airframe 2;

a pair of rotors 21*a*, 21*b* which are rotatable about respective fixed axes D, E with respect to the airframe 2; and a pair of rotors 22*a*, 22*b* which are rotatable about respective axes F, G and inclinable with respect to an axis H between a first position assumed when the aircraft 1 is in the first configuration and a second position assumed when the aircraft 1 is in the second configuration.

In the shown case, the axes F, G of the rotors 22*a*, 22*b* are inclinable with respect to the axis H by more or less fifteen degrees towards the nose 4 or the tail 5 with respect to the axis Z.

The aircraft 1 further comprises a control unit 71 (FIGS. 11 and 15) receiving at input a plurality of control signals provided by the crew, an autopilot or a remote control system, and programmed to provide as output a plurality of commands to command the rotors 20*a*, 20*b*; 21*a*, 21*b*; 22*a*, 22*b* so that they provide desired values of the relative thrusts T1, T2; T3, T4; T5, T6 (FIGS. 6*a* to 6*h*).

In more detail, the control unit 71 is programmed to command the rotors 20*a*, 20*b*; 21*a*, 21*b*; 22*a*, 22*b* to generate respective independent thrusts T1, T2; T3, T4; T5, T6.

More particularly, the control unit 71 is programmed to command the rotors 20*a*, 20*b*; 21*a*, 21*b*; to generate respective thrusts T1, T2 (T3, T4) having a resultant which is parallel to the axis Z, either when the aircraft 1 is in the first configuration or when the aircraft 1 is in the second configuration.

The control unit 71 is programmed to command the rotors 20*a*, 20*b*; 21*a*, 21*b* to generate respective zero thrusts T1, T2; T3, T4 under predetermined operating conditions and when the aircraft 1 is in the first configuration.

The axes B, C; D, E and F, G are arranged symmetrically to the axis Y.

In the case shown, the axes B, C, D and E are parallel to each other and parallel to the axis Z.

The axes B, D, F; C, E, G are aligned with each other parallel to the axis Y when the aircraft 1 is arranged in the first configuration.

The axis H is parallel to the axis X.

The axes F, G are arranged parallel to the axis Z when the rotors 22*a*, 22*b* are arranged in the first position.

The axes F, G are arranged orthogonally to the axes B, C; D, E and parallel to the axis Y when the rotors 22*a*, 22*b* are arranged in the second position.

The thrusts T1, T2; T3, T4 have a main component which is parallel to the respective axes B, C; D, E and is parallel to the axis Z either when the aircraft 1 is arranged in the first configuration or when the aircraft 1 is arranged in the second configuration.

The thrusts T5, T6 have a main component which is parallel to the axes B, C; D, E and the axis Z when the aircraft 1 is arranged in the first configuration and a main component to the axis Y when the aircraft 1 is arranged in the second configuration.

In one embodiment, the rotors 20*a*, 20*b*; 21*a*, 21*b*; 22*a*, 22*b* are with fixed pitch.

Preferably, the rotors 20*a*, 20*b*; 21*a*, 21*b*; 22*a*, 22*c* are driven by respective electric motors.

The aircraft 1 also comprises:

a pair of supports 30*a*, 30*b* in order to support respective rotors 20*a*, 20*b* in a fixed manner with respect to respective aerodynamic surfaces 9;

a pair of supports 31*a*, 31*b* in order to support respective rotors 21*a*, 21*b* in a fixed manner with respect to the airframe 2; and a pair of supports 32*a*, 32*b* in order to support respective rotors 22*a*, 22*b* to respective half-wings 3 in an inclinable manner with respect to the axis H.

Preferably, the supports 32*a*, 32*b* are spaced apart from the ends 15 of the respective half-wings 3, with reference to an extension direction of the same half-wings 3.

More precisely, the supports 32*a*, 32*b* are carried by respective root portions 11 of respective half-wings 3.

The supports 30*a*, 30*b* are spaced apart from the free ends of the respective aerodynamic surfaces 9, with reference to an extension direction of the same aerodynamic surfaces 9.

In particular, the supports 30*a*, 30*b* are conformed as respective rods projecting cantilevered below from respective aerodynamic surfaces 9 anteriorly to the nose 4.

In the shown case, the supports 30*a*, 30*b* are fixed to respective root portions 17 of corresponding aerodynamic surfaces 9.

The axes B, C are arranged anteriorly to the nose 4.

The supports 31*a*, 31*b* are conformed as rods projecting cantilevered from respective sidewalls 62 of the airframe 2 laterally to the fin 7, posteriorly to the respective half-wings 3 and anteriorly to the respective aerodynamic surfaces 8.

The rotors 21*a*, 21*b* are arranged laterally to the fin 7 and inferiorly to the respective aerodynamic surfaces 8, and posteriorly to the respective half-wings 3.

The axes D, E are arranged anteriorly to the respective aerodynamic surfaces 8.

The supports 32*a*, 32*b* comprise:

respective rods 33*a*, 33*b* projecting cantilevered anteriorly in a fixed manner from respective half-wings 3; and respective pins 34*a*, 34*b* that are rotatable about corresponding rods 33*a*, 33*b* parallel to the axis H and supporting respective rotors 22*a*, 22*b* about respective axes F, G.

The pins 34*a*, 34*b* are interposed between the respective half-wings 3 and the nose 4 along the axis Y.

The rotors 22*a*, 22*b* are interposed between the respective half-wings 3 and the nose 4 along the axis Y either when the aircraft 1 is arranged in the first configuration or when the aircraft 1 is arranged in the second configuration.

The rotors 22*a*, 22*b* are arranged superiorly to the respective half-wings 3 when the aircraft 1 is arranged in the first configuration, and anteriorly to the respective half-wings 3 when the aircraft 1 is arranged in the second configuration.

The fin 7 extends from both the upper and lower sides of the tail 5 of the airframe 2.

The aircraft 1 also comprises (FIGS. 3 and 4):

a pair of first carriages 45 carried by respective aerodynamic surfaces 9; and a carriage 46 carried by the fin 7 in a position opposite to the aerodynamic surfaces 9.

Preferably, the airframe 2 defines a compartment 60 and a plurality of openings 61 for access to the compartment 60.

The compartment 60 may accommodate crew or passengers, or instrumentation or cargo to be transported, depending on how the aircraft is used 1.

The openings 61 are located at sidewalls 62 of the airframe 3.

The openings 61 are, moreover, arranged in a zone 63 which is delimited along the axis Y between the half-wings 3 and the aerodynamic surfaces 9.

Figure 5:
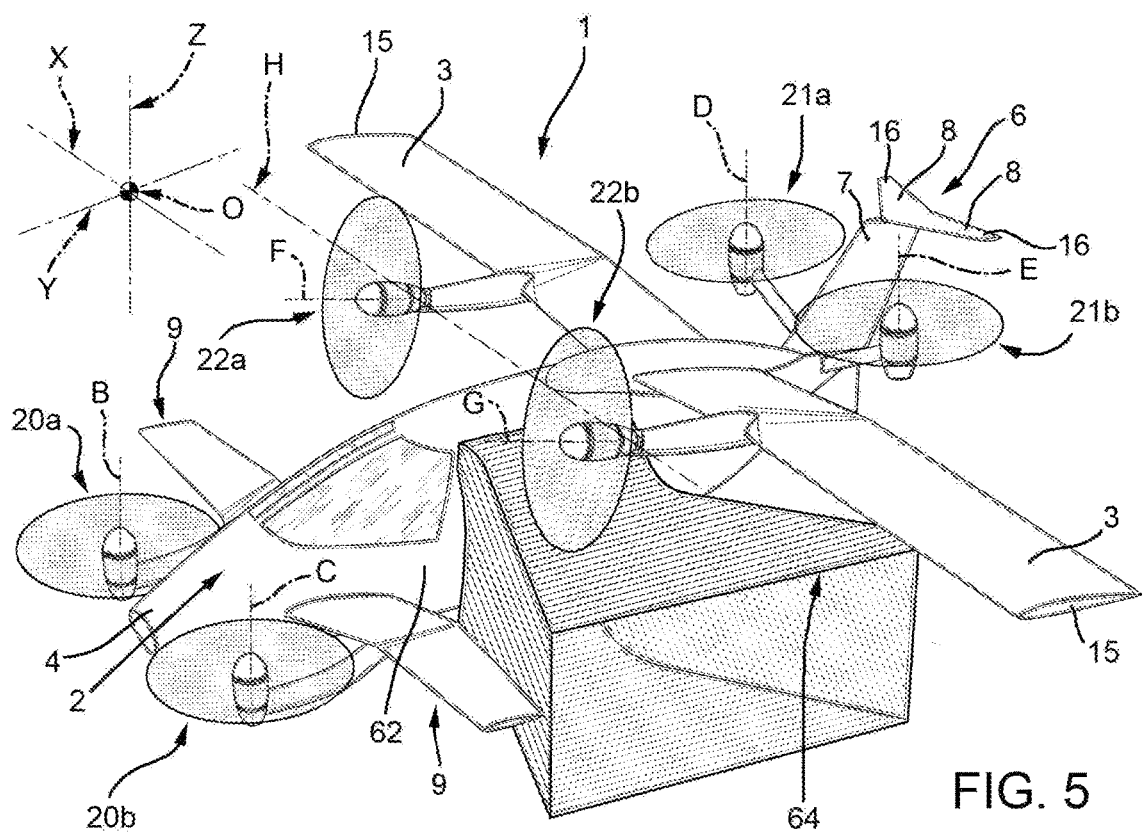
FIG. 5 shows first details of the aircraft of FIGS. 1 to 4.
Figure 16:
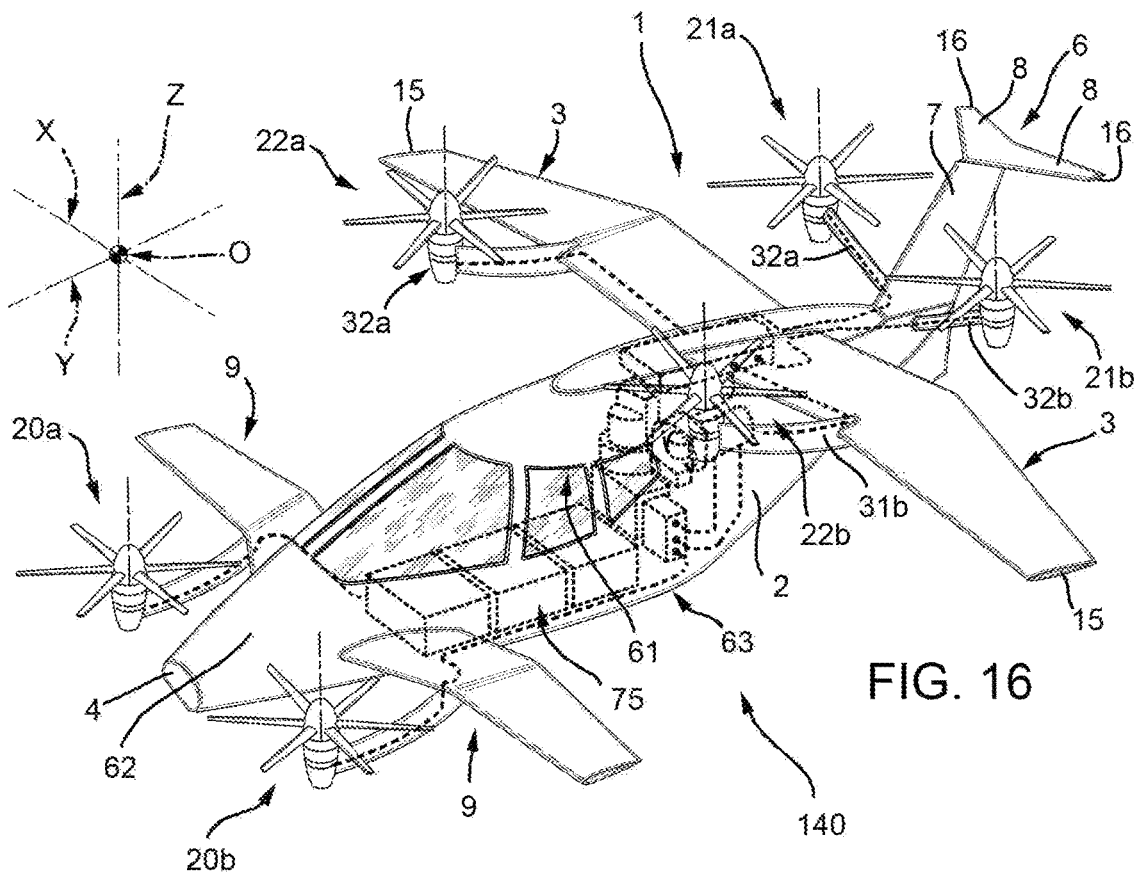
FIG. 16 shows in perspective view some details of the fourth architecture of the aircraft of FIGS. 1 to 8.
Figure 6:
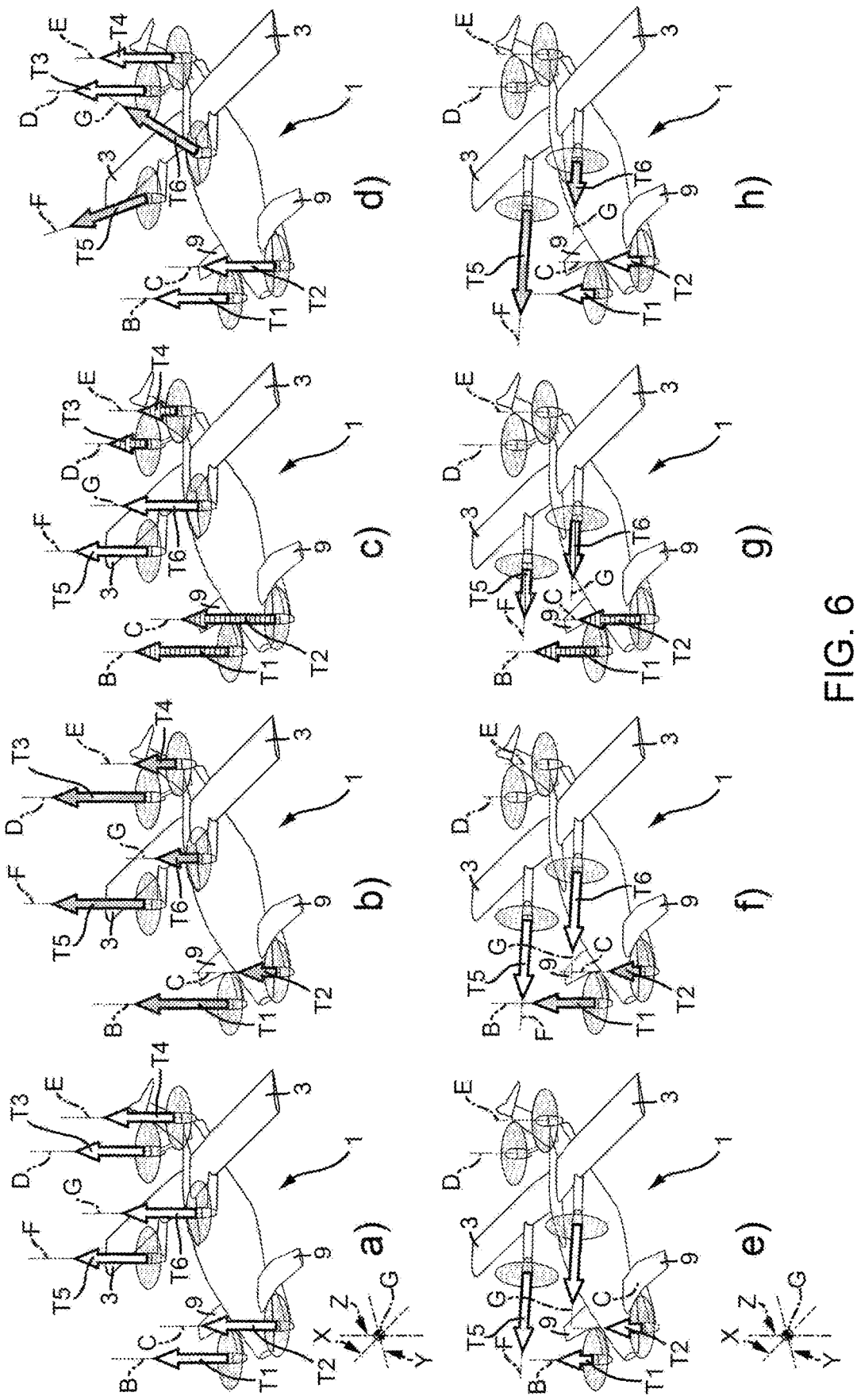
FIGS. 6a to 6h show respective control manoeuvres of the aircraft of FIGS. 1 to 5.
Figure 7:
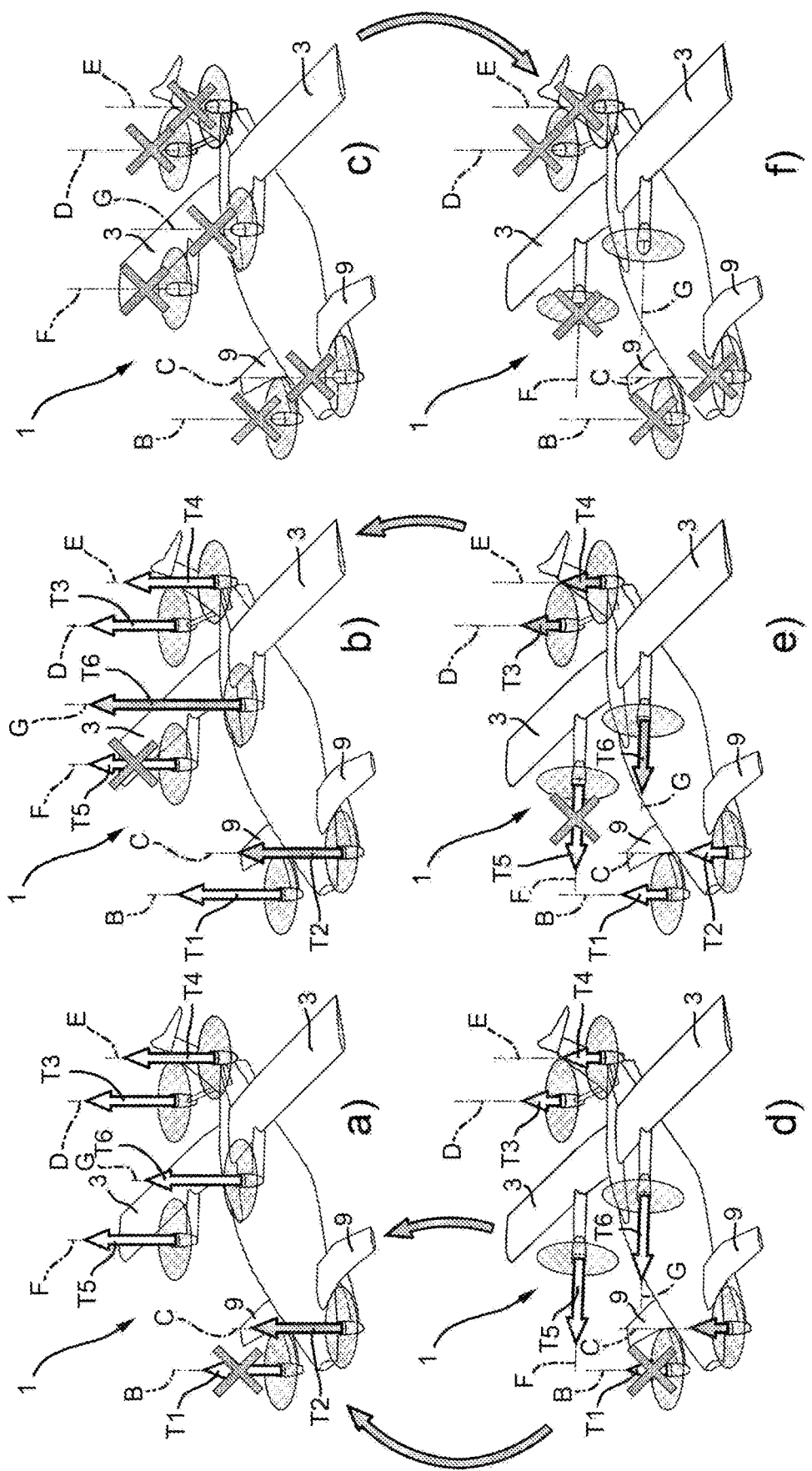
FIGS. 7a to 7f show respective emergency manoeuvres of the aircraft of FIGS. 1 to 5.
Figure 8:
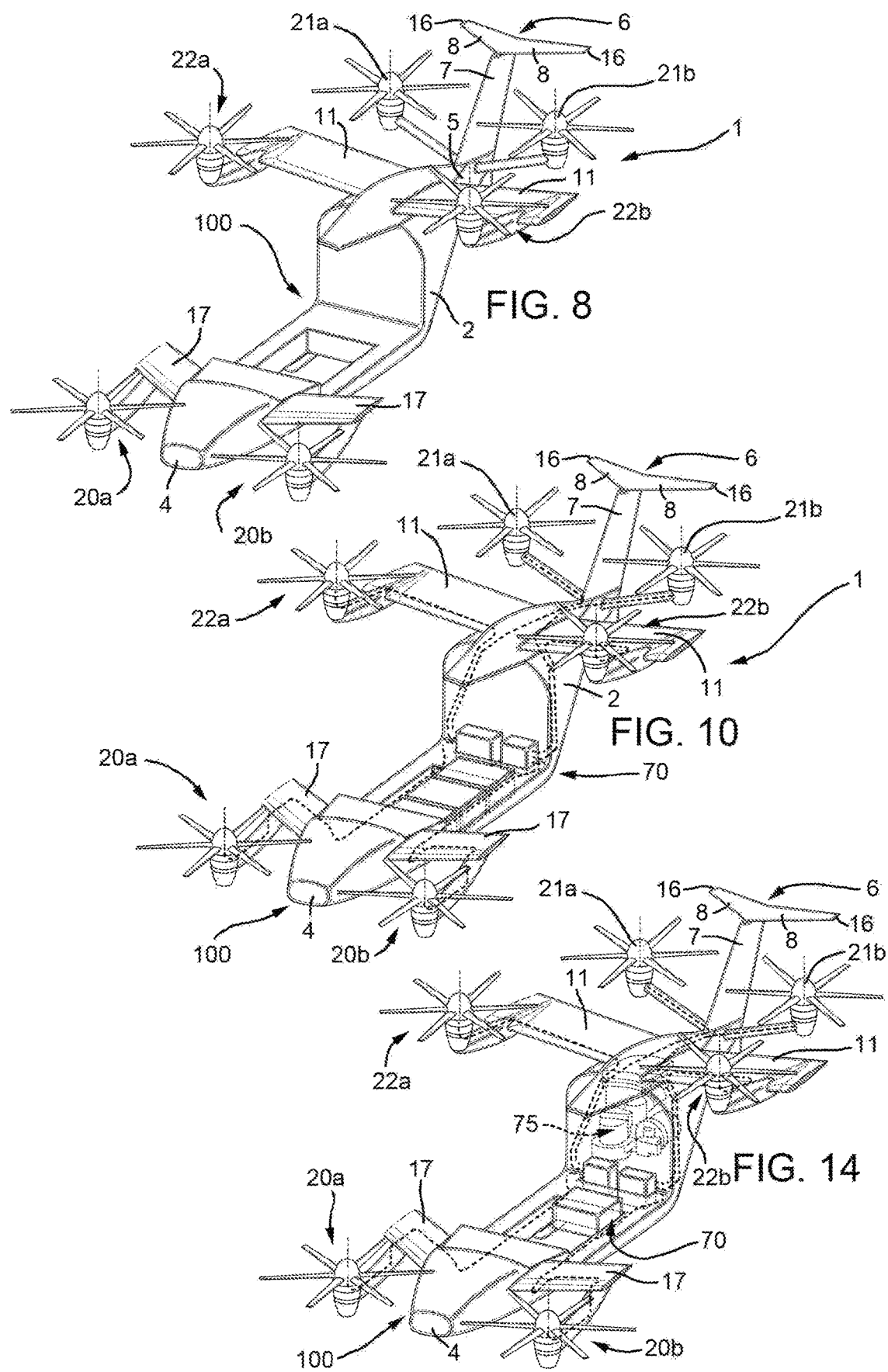
FIG. 8 shows a core which is common to different architectures of the aircraft of FIGS. 1 to 5.

When it is arranged on the ground in the first configuration, the aircraft 1 defines an aisle 64 for access to the opening 61. The aisle 64 is delimited along the axis Y between the half-wings 3 and the aerodynamic surfaces 9 and parallel to the axes B, C between the ground and the supports 32a, 32b of the rotors 22a, 22b arranged in the second position (FIG. 5).

Thanks to the fact that the rotors 20a, 20b are arranged anteriorly to the relevant aerodynamic surfaces 9 and the rotors 22a, 22b are arranged superiorly to the relevant half-wings 3a, 3b, the aisle 64 is clear and easily accessible during boarding/disembarking of passengers and/or loading/unloading of baggage.

With reference to FIGS. 6a-6d and to the first configuration, the aircraft 1 is controlled as follows.

Under steady state conditions, the thrusts T1, T2, T3, T4, T5, T6 allow the aircraft 1 to be sustained with a certain degree of redundancy (FIG. 6a).

In order to perform a roll manoeuvre (FIG. 6b), the control unit 71 is programmed to command the rotors 20a, 20b, 21a, 21b, 22a, 22b so that the thrusts T1, T3, T5 are higher (lower) than the thrusts T2, T4, T6.

For example, the rotors 20a, 20b, 21a, 21b, 22a, 22b are commanded by the control unit 71 so as to increase (decrease) the thrusts T1, T3, T5 and to decrease (increase) the thrusts T2, T4, T6.

This generates three differential thrusts of concordant sign T1-T2; T3-T4 and T5-T6 which generate a torque and a consequent rotation of the aircraft around the axis Y.

In order to perform a pitch manoeuvre (FIG. 6c), the control unit 71 is programmed to command the rotors 20a, 20b, 21a, 21b, 22a, 22b so that the thrusts T1, T2 are equal to each other higher than (lower than) the thrusts T3, T4 equal to each other.

For example, the rotors 20a, 20b, 21a, 21b are commanded so as to increase (decrease) the thrusts T1, T2 and to decrease (increase) the thrusts T3, T4.

This generates two differential thrusts of concordant sign T1-T3 and T2-T4 which generate a torque and a consequent rotation of the aircraft around the axis X.

In order to perform a yaw manoeuvre (FIG. 6d), the control unit 71 is programmed to orient the axis F of the rotor 22a towards (opposite side of) the nose 4 and the axis G of the rotor 22b towards (opposite side of) the tail 5.

This generates two components of the thrusts T5, T6 that are parallel to the axis Y and discordant to each other which generate a torque and a consequent rotation of the aircraft around the axis Z.

With reference to FIGS. 6e-6h and to the second configuration, aircraft 1 is controlled as follows.

Under steady state conditions (FIG. 6e), the control unit 71 is programmed to command the rotors 20a, 20b so that the respective thrusts T1, T2 ensure the correct trimming of the aircraft 1—that is, the correct adjustment of the overall lift/downforce value depending on the required speed and weight conditions of the aircraft 1—while and deactivates the rotors T5, T6 so that the thrusts T3, T4 are zero.

In order to perform a roll manoeuvre (FIG. 6f), the control unit 71 is programmed to command the rotors 20a, 20b so that the thrust T1 is higher (lower) than the thrust T2.

For example, the rotors 20a, 20b, are commanded to increase (decrease) thrust T1 and to decrease (increase) thrust T2.

This generates a differential thrust T1-T2 which generates a torque and a consequent rotation of the aircraft around the axis Y.

In order to perform a pitch manoeuvre (FIG. 6g), the control unit 71 is programmed to command the rotors 20a, 20b, 22a, 22b so as to increase (decrease) the thrusts T1, T2 equal to each other and to adjust the thrusts T5, T6 equal to each other.

This generates a torque and a consequent rotation of the aircraft around the axis X.

In order to perform a yaw manoeuvre (FIG. 6h), the control unit 71 commands the rotors 22a, 22b so that the thrust T1 is greater (lower) than the thrust T6.

For example, the rotors 22a, 22b are controlled by the control unit 71 so that the thrust T5 is greater (lower) than the thrust T6.

This generates a torque and a consequent rotation of the aircraft around the axis Z.

The control unit 71 is, moreover, programmed to reduce the thrusts T1, T2; T3, T4 of the rotors 20a, 20b; 21a, 21b as the axes F, G of the rotors 22a, 22b progressively approach a condition of parallelism with the axis Y and the speed of the aircraft 1 increases.

The series according to the invention comprises a plurality of aircraft 1 having modular conformation and adapted to be reconfigured according to operational needs so as to each assume a plurality of architectures different from each other.

In more detail, the aircraft 1 can assume:
  a first architecture (FIGS. 9 to 11) which is preferably used for urban mobility and passenger transport applications;
  a second architecture (FIGS. 12, 14 and 15), wherein it is used as a utility category aircraft;
  a third architecture (FIGS. 13, 14 and 15), wherein it is used to transport VIP passengers; or
  a fourth architecture (FIGS. 16 to 19), wherein it is used as a remote-controlled aircraft.

In more detail, the series comprises a core 100 that is common (FIG. 8) to all aircraft 1.

Advantageously, the series comprises a plurality of modules 110; 120, 130; and 140 that are interfaceable with the core 100 in order to achieve the first, second, third and fourth aircraft architecture 1, respectively; the core 100 comprises the root portions 11, 17 of the half-wings 3 and of the aerodynamic surfaces 9, respectively; each module 110, 120, 130, 140 further comprises (FIGS. 9, 12, 13 and 19):
  respective end portions 12 for corresponding half-wings 3; and
  respective end portions 18 for corresponding aerodynamic surfaces 9.

In this way, the half-wings 3 and the aerodynamic surfaces 9 are optimised according to the flight envelope that are characteristic of the first, second, third and fourth architecture.

Figure 9:
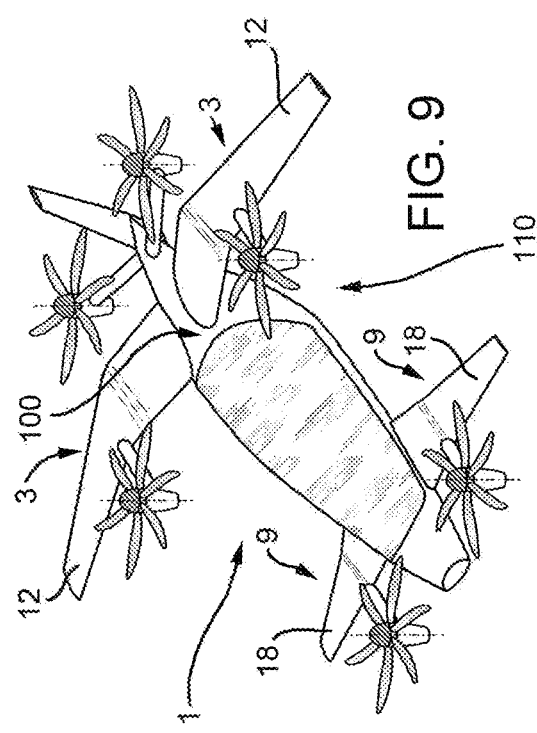
FIG. 9 shows in perspective view a first architecture of the aircraft of FIGS. 1 to 8.

The core 100 further comprises:
  the airframe 2, the tail portion 6 and the fin 7 (FIG. 8), and the rotors 20a, 20b; 21a, 21b; 22a, 22b; and
  an all-electric propulsion system 70 to command the rotors 20a, 20b, 21a, 21b, 22a, 22b independently of each other (FIGS. 9 and 10).

The system 70 comprises, in more detail (FIG. 11):
  the control unit 71 adapted to receive the control signals of the aircraft 1 at input; and
  a plurality of electric motors 72a, 72b, 73a, 73b, 74a, 74b commanded by the control unit 71 and adapted to command respective rotors 20a, 20b, 21a, 21b, 22a, 22b so that they generate respective thrusts T1, T2, T3, T4, T5, T6.

The system 70 further comprises a plurality of electric batteries 81, which electrically power the electric motors 72a, 72b, 73a, 73b, 74a, 74b.

With reference to FIG. 9, the module 110 provides the aircraft 1 with the first architecture.

The module 110 defines the compartment 60, which forms a compartment for the passengers and relative baggage. The compartment 60 is accessible through the aisle 64 for the operations of passenger boarding/disembarking and baggage loading/unloading.

Figure 11:
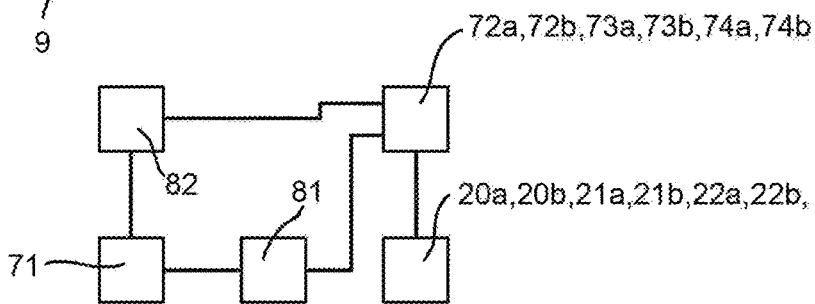
FIG. 11 schematically shows a propulsion system implemented in the first architecture in FIGS. 9 and 10.
Figure 15:
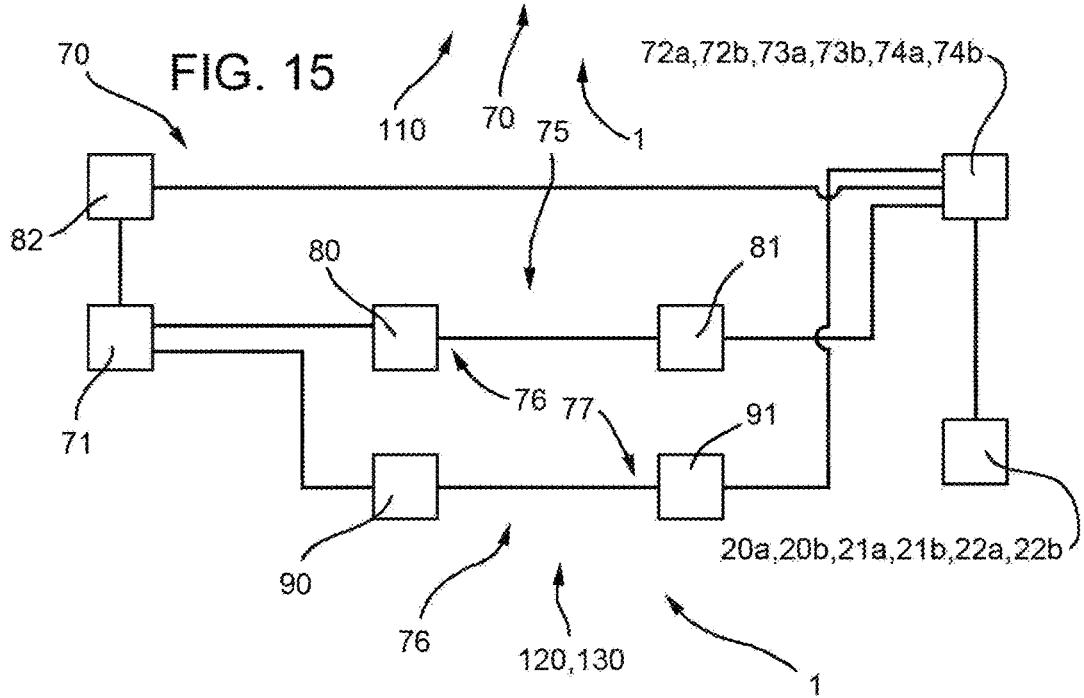
FIG. 15 schematically shows a propulsion system implemented in the second and third architecture of FIGS. 13 and 14.
Figure 13:
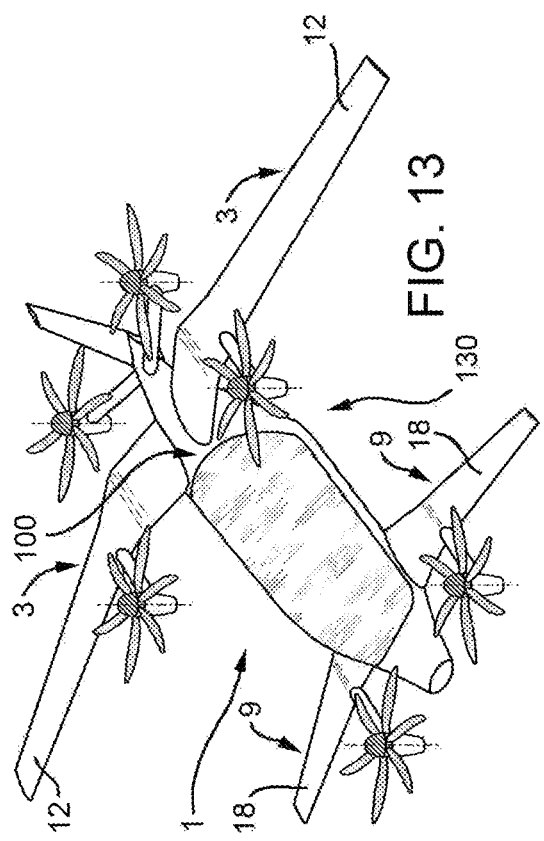
FIG. 13 shows in perspective view a third architecture of the aircraft of FIGS. 1 to 8.
Figure 12:
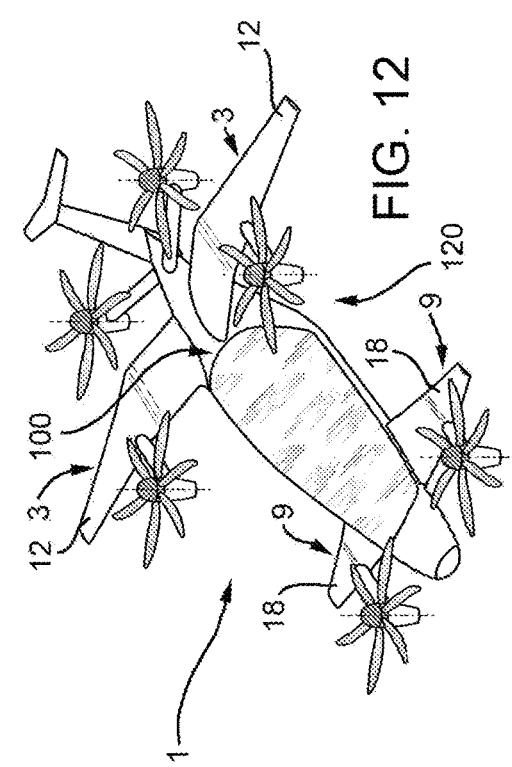
FIG. 12 shows in perspective view a second architecture of the aircraft of FIGS. 1 to 8.
Figure 19:
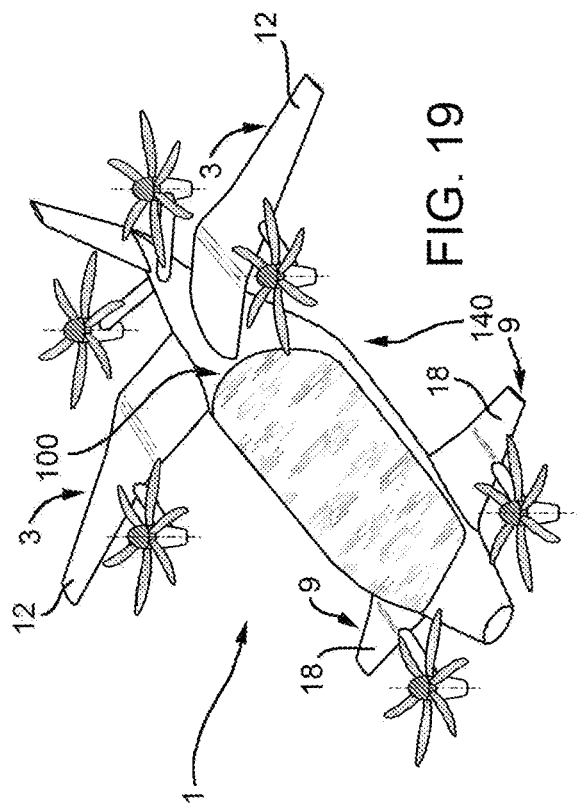
FIG. 19 shows in perspective view the fourth architecture of FIGS. 16 to 18.

With reference to FIGS. 11 and 13, the modules 120, 130 provide the aircraft 1 with the second and third architecture, respectively.

In particular, similar to the module 110, the module 120, 130 defines the compartment 60 for passengers and relative baggage. The compartment 60 is accessible through the aisle 64.

The module 120, 130 comprises a hybrid propulsion system 75 (FIGS. 14 and 15), which comprises the components of the system 70.

The system 75 of the modules 120, 130 comprises, in particular:
- the system 70;
- a first section 76; and
- a second section 77.

The section 76 comprises, in turn:
- a heat engine 80, e.g. a Diesel engine; and
- a plurality of generators 81 driven by the heat engine 80 and selectively connectable with the electric motors 72a, 72b, 73a, 73b, 74a, 74b.

The section 77 comprises, in turn:
- a heat engine 90; and
- a plurality of electric generators 91 that are driven by the heat engine 90 and selectively connectable with the electric motors 72a, 72b, 73a, 73b, 74a, 74b.

In particular, the heat engine 90 has a maximum power that is greater than the heat engine 80.

Similarly, the generators 91 have a maximum power that is greater than the generators 82.

Preferably, when the aircraft 1 is in the first configuration for a short time interval and the rotors 20a, 20b, 21a, 21b, 22a, 22b must generate a large power for a short time interval, the control unit 71 is programmed to electrically connect either the generators 91 or the batteries 81 to the electric motors 72a, 72b, 73a, 73b, 74a, 74b.

When the aircraft 1 is in the first configuration for a long time interval and the rotors 20a, 20b, 21a, 21b, 22a, 22b must generate a large power for the aforesaid long time interval, the control unit 71 is programmed to electrically connect both generators 82, 91 powered by respective heat engines 80, 90 to the corresponding electric motors 72a, 72b, 73a, 73b, 74a, 74b.

When the aircraft 1 is in the second configuration, the control unit 71 is programmed to connect the heat engine 80.

The heat engine 80 drives the generator 82, which electrically powers the electric motors 72a, 72b, 73a, 73b, 74a, 74b and, preferably, to recharge the batteries 81 through the generator 82.

Under emergency conditions and consequent failure of the heat engines 80, 90, the control unit 71 is programmed to electrically connect the electric batteries 81 to the electric motors 72a, 72b, 73a, 73b, 74a, 74b.

With reference to FIGS. 16 to 19, the module 140 provides the aircraft 1 with the fourth architecture.

In more detail, the module 140 comprises, similarly to the module 130, the heat engines 80 and 90 and the electric generators 91, 82.

The system 75 of the module 140 is totally identical to that of the modules 120, 130.

The module 140 also defines a cargo housing compartment 60 equipped with a sliding ramp that can be folded into the compartment 60.

Alternatively, the compartment 60 houses (FIGS. 17 and 18):

- a sub-module 141 occupying the entire compartment 60 for large sized payloads; or
- a pair of sub-modules 142 each occupying half of the volume of the compartment 60 and defining respective compactly sized payloads, e.g., additional electric batteries 85 to electrically power the rotors 20a, 20b, 21a, 21b, 22a, 22b when the aircraft 1 is in the first configuration; or
- a sub-module 142 and a sub-module 143 similar to the sub-module 142 but provided with a socket 144 for charging the electric batteries 81, 85 which is arranged at a belly 10 of the airframe 2.

In the following and with reference to FIG. 6a, the operation of an aircraft 1 of the series according to the invention is described.

The aircraft 1 lands and takes off arranged in the first configuration with the rotors 22a, 22b arranged in the first position wherein the relative thrusts T5, T6 are directed parallel to the axis Z (FIG. 6a).

The aircraft 1 moves forward in the second configuration with the rotors 22a, 22b arranged in the second position wherein the respective thrusts T5, T6 are arranged parallel to the axis Y.

In the first configuration, the lift required to sustain the aircraft 1 is delivered by the rotors 20a, 20b; 21a, 21b and 22a, 22b.

In order to perform a roll manoeuvre (FIG. 6b), the control unit 71 is programmed to command the rotors 20a, 20b, 21a, 21b, 22a, 22b so that the thrusts T1, T3, T5 are higher (lower) than the thrusts T2, T4, T6.

This generates three differential thrusts of concordant sign T1-T2; T3-T4 and T5-T6 which generate a torque and a consequent rotation of the aircraft around the axis Y.

In order to perform a pitch manoeuvre (FIG. 6c), the control unit 71 is programmed to command the rotors 20a, 20b, 21a, 21b, 22a, 22b so that the thrusts T1, T2 are equal to each other higher (lower) than the thrusts T3, T4 equal to each other.

This generates two differential thrusts of concordant sign T1-T3 and T2-T4 which generate a torque and a consequent rotation of the aircraft around the axis X.

In order to perform a yaw manoeuvre (FIG. 6d), the control unit 71 is programmed to command the rotor 22a so that the axis F is oriented towards (opposite side of) the nose 4 and the rotor 22b so that the axis G is oriented towards (opposite side of) the tail 5.

This generates two components of the thrusts T5, T6 that are parallel to the axis Y and discordant to each other which generate a torque and a consequent rotation of the aircraft around the axis Z.

During the transition from the first to the second configuration of the aircraft, the control unit 71 is programmed to reduce the thrusts T1, T2; T3, T4 of the rotors 20a, 20b; 21a, 21b as the axes F, G of the rotors 22a, 22b progressively approach a condition of parallelism with the axis Y and the speed of the aircraft 1 increases.

In the second configuration shown in FIG. 6e, the lift required to sustain the aircraft 1 is mostly provided by the half-wings 3. The rotors 20a, 20b; 21a, 21b can be optionally deactivated.

In more detail, the thrusts T1, T2 of the rotors 20a, 20b ensure the correct trimming of the aircraft 1—i.e. the adjustment of the overall lift/downforce value based on the required speed and weight conditions of the aircraft 1—while the rotors 21a, 21b are deactivated so that the thrusts T3, T4 are zero.

In order to perform a roll manoeuvre (FIG. 6f), the rotors 20a, 20b are controlled by the control unit 71 so that the thrust T1 is higher (lower) than the thrust T2.

This generates a differential thrust T1-T2, which results in a torque and a consequent rotation of the aircraft around the axis Y.

In order to perform a pitch manoeuvre (FIG. 6g), the rotors 20a, 20b, 22a, 22b are controlled by the control unit 71, so as to increase (decrease) the thrusts T1, T2 equal to each other and to adjust the thrusts T5, T6 equal to each other.

This generates a torque and a consequent rotation of the aircraft around the axis X.

In order to perform a yaw manoeuvre (FIG. 6h), the rotors 22a, 22b are controlled by the control unit 71 so that the thrust T1 is greater (lower) than the thrust T6.

This generates a torque and a consequent rotation of the aircraft around the axis Z.

When the aircraft 1 is in the second configuration, the appendages 14 may be moved with respect to the relative aerodynamic surfaces 8 in a concordant or discordant manner with each other, and thus contribute to the control of the aircraft 1.

In particular, the concordant movement of the appendages 14 results in a torque around the axis X and increases the second lift value.

Conversely, the discordant movement of the appendages 14 results in a torque around the axis Y on aircraft 1.

In the event of a failure of one or both of the rotors 20a, 20b; 22a, 22b with the aircraft 1 arranged in the second configuration (FIG. 7d), the control unit 71 rotates the rotors 22a, 22b in the respective first positions, and increases the thrusts T1, T2, T3, T4 of the rotors 20a, 20b, 21a, 21b which are optionally still operating and the thrusts, T5, T6 of the rotors, 22a, 22b (FIG. 7a).

Similarly, in the event of failure of one or both rotors 22a, 22b with the aircraft 1 arranged in the second configuration (FIG. 7e), the control unit 71 rotates the rotors 22a, 22b in the respective first positions, and increases the thrusts T1, T2, T3, T4 of the rotors 20a, 20b, 21a, 21b and the thrusts T5, T6 of the rotors 22a, 22b which are optionally still operating (FIG. 7b).

In this way, after a temporary compensation of the missing thrust T1, T5 of the rotor 20a, 22a, the aircraft 1 assumes the first configuration wherein it can land safely.

In the event of failure of the aircraft 1 in the first configuration (FIG. 7c), the control unit 71 rotates the rotors 22a, 22b in the respective second positions (FIG. 7f). In this way, the aircraft 1 can efficiently glide in order to reach a landing site.

In the first architecture (FIGS. 9 to 11) of the series according to the invention, the aircraft 1 is used for urban mobility and passenger transport applications within the compartment 60 and the module 110 is interfaced with the core 100.

The passengers and the baggage, if any, access the compartment 60 through the aisle 64 when the aircraft 1 is arranged in the first configuration.

The control unit 71 receives at input the control signals of the aircraft 1 and consequently commands the electric motors 72a, 72b, 73a, 73b, 74a, 74b so as to obtain respective desired thrusts T1, T2, T3, T4, T5, T6 from the respective rotors 20a, 20b, 21a, 21b, 22a, 22b.

The electric batteries 81 electrically power the electric motors 72a, 72b, 73a, 73b, 74a, 74b.

In the second and third architecture (FIGS. 12 to 15) of the series according to the invention, the aircraft 1 realizes a Utility category aircraft or is deployed for VIP passenger transport, and the respective modules 120, 130 are interfaced with the core 100.

In both cases, the passengers and the baggage are accommodated inside compartment 60.

When the aircraft 1 is in the first configuration for a short time interval, the heat engine 90 provides mechanical power to the generators 91.

The batteries 81 and the generators 91 electrically power the electric motors 72a, 72b, 73a, 73b, 74a, 74b, which drive the respective rotors 20a, 20b, 21a, 21b, 22a, 22b into rotation.

If the high power required by the first hovering flight configuration is required for a long time interval, both heat engines 80, 90 provide mechanical power to the respective generators 82, 91. The generators 82, 91 are in turn electrically connected to the electric motors 72a, 72b, 73a, 73b, 74a, 74b which drive the respective rotors 20a, 20b, 21a, 21b, 22a, 22b into rotation.

When the aircraft 1 transits to the second configuration wherein the power required for cruise flight is lower than that required in the first configuration, the heat engine 90 is deactivated and the heat engine 80 alone drives the electric motors 72a, 72b, 73a, 73b, 74a, 74b and recharges the batteries 81.

In the event of a failure of the heat engines 80, 90, the batteries 81 power the electric motors 72a, 72b, 73a, 73b, 74a, 74b exclusively.

In the fourth architecture (FIGS. 16 to 19) of the series according to the invention, the aircraft 1 is deployed as a remotely operated aircraft capable of carrying out long duration missions. Depending on the operational needs, either the sub-module 141, the sub-modules 142 or a sub-module 141 and a sub-module 143 are housed inside the compartment 60.

Figure 2:
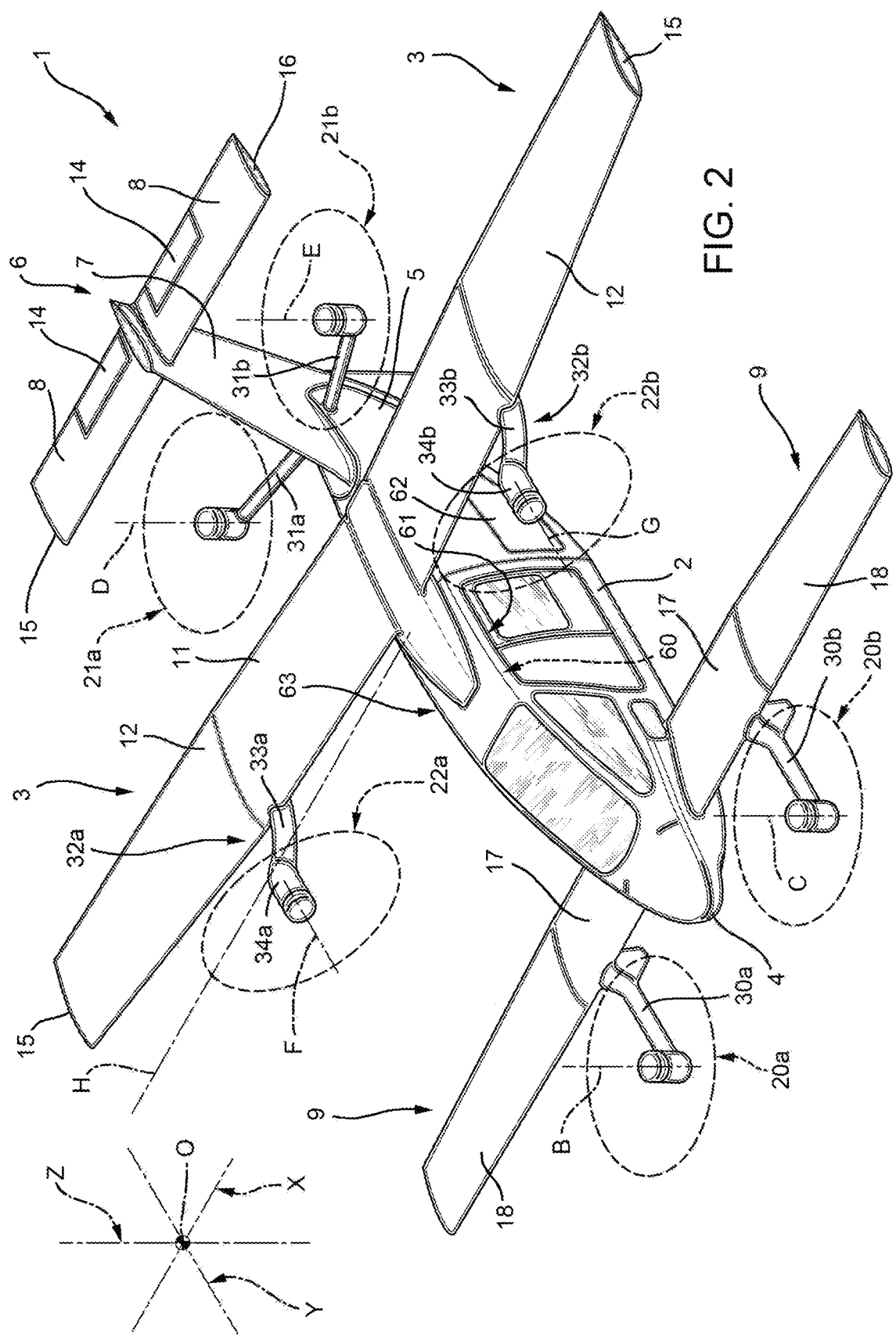
FIG. 2 is a perspective view of the aircraft of FIG. 1 arranged in a second configuration.

With reference to FIGS. 20 and 21, 1' denotes an aircraft according to a further embodiment of the invention.

The aircraft 1' is similar to the aircraft 1 and will be described below only insofar as it differs from the latter; equal or equivalent parts of the lubrication systems 1, 1' will be marked, where possible, by the same reference numbers.

In particular, the aircraft 1' differs from the aircraft 1 in that the tail portion 6' is cruciform and in that the supports 31a, 31b project cantilevered from respective sidewalls of the fin 7.

The aerodynamic surfaces 8' are arranged inferiorly to the respective rotors 21a, 21b.

The aerodynamic surfaces 8' support the respective rotors 21a, 21b and have respective fairings 13' that are movable between:

a first position wherein the respective cords have a lying position substantially orthogonal to the axes X, Y which is assumed when the aircraft 1 is in the first configuration, so as to limit the interference with the flow of air directed downwards and generated by the rotors 21a, 21b (FIG. 21); and a second position wherein the respective cords have a lying position substantially orthogonal to the axes Z, X which is assumed when the aircraft 1 is in the second configuration (FIG. 19) and wherein the rotors 21a, 21b are turned off or deactivated.

The fairings 13' at least partially accommodate the respective supports 31a, 31b and are movable with respect to said supports 31a, 31b between the respective first and second position.

The aircraft 1' also differs from the aircraft 1 in that the appendages 14' are arranged on respective aerodynamic surfaces 9 instead of on respective aerodynamic surfaces 8. The operation of the aircraft 1' differs from that of the aircraft 1 in that the fairings 13' are moved with respect to the relative aerodynamic surfaces 8' from the respective first to the respective second positions and vice versa, when the aircraft 1' transits from the second to the first configuration and vice versa.

From an examination of the characteristics of the aircraft series 1, 1' and of the method according to the present invention, the advantages it allows to be obtained are evident.

In particular, each aircraft 1, 1' of the series comprises a common core 100 and a respective module 110, 120, 130, 140 associated respectively with the first, second, third or fourth architecture and interfaced with said core 100.

In this way, it is possible to reconfigure the aircraft 1, 1' so that it is capable of carrying out different types of manned operational missions, such as those required by the urban mode deployment (first architecture), deployment as a Utility aircraft (second architecture) or deployment as a VIP category transport aircraft (third architecture).

Similarly, the aircraft 1, 1' can be easily reconfigured to be used as a remote-controlled aircraft (fourth architecture).

Each module 110, 120, 130, 140 comprises, in particular, respective end portions 12, 18 of corresponding half-wings 3 and aerodynamic surfaces 9.

In this way, each module 110, 120, 130, 140 optimises the aerodynamic behaviour of the first, second, third and fourth architecture of the aircraft 1, F, based on the respective operational missions.

The core 100 further comprises the rechargeable electric power source 81 and the electric motors 72a, 72b, 73a, 73b, 74a, 74b which are operatively connected to the rotors 20a, 20b, 21a, 21b, 22a, 22b.

In this way, it is possible to use the same core 100 to make either an all-electric propulsion aircraft 1, 1' by using the module 110 or a hybrid propulsion aircraft by using modules 120, 130.

Clearly, changes may be made to the series of aircraft 1, 1' and to the method as described and shown herein without, however, departing from the scope of protection defined by the claims.

In particular, the aircraft 1, 1' could comprise instead of the rotors 22a, 22b, one or more reaction or jet engines fueled by fossil fuel, which are fixed with respect to the airframe 2, and configured to generate a thrust parallel to the axis Y under forward flight conditions.

The aircraft 1, 1' may not comprise the aerodynamic surfaces 8.

The supports 31a, 31b may project cantilevered posteriorly from respective half-wings 3 instead of from respective sidewalls 62 of the airframe 2.

The axes B, C; D, E may not be parallel to the axis Z and may be inclined with respect to the axis Z by an angle ranging between −15 and +15 degrees. In particular, the axes B, C (D, E) could converge in the axis Z above or below the airframe 2.

At least some or all of the rotors 20a, 20b, 21a, 21b, 22a, 22b could have variable pitch.

The invention claimed is:

1. Series of aircraft that can be converted and configured in respective mutually distinct architectures based on the operational needs of the aircraft;

each said aircraft of said series comprising:
 a core that is common to all said architectures;
 an airframe defining a first longitudinal axis of said aircraft, and defining a nose and a tail of said aircraft;
 a first and a second rotor which are rotatable, respectively, about a second and third axis which is fixed with respect to said airframe, and which are operable independently of each other so as to generate, respectively, a first and a second thrust value independent of each other;
 a third and a fourth rotor which are rotatable, respectively, about a fourth and fifth axis which is fixed with respect to said airframe, and which are operable independently of each other so as to generate, respectively, a third and a fourth thrust value independent of each other;
said second, third, fourth and fifth axis being parallel to each other;
said second and third axis being arranged respectively on the sides of a first and a second sidewall that are opposite to each other of said airframe and symmetrically with respect to said first axis;
said fourth and fifth axis being arranged respectively on the sides of said first and second sidewall of said airframe and symmetrically with respect to said first axis;
each said aircraft of said series further comprising:
 a fifth and a sixth rotor carried by respective half-wings, which are rotatable respectively about a sixth and a seventh axis, and operable independently of each other so as to generate respectively a fifth and a sixth thrust value independent of each other;
said sixth and seventh axis being arranged respectively on said first and second sidewall of said airframe symmetrically with respect to said first axis;
each said aircraft further comprising:
 a pair of half-wings extending cantilevered from mutually opposite said first and second sidewalls and transversely of said first axis;
 a pair of aerodynamic surfaces projecting cantilevered from mutually opposite sides of said nose;
characterized in that said series comprises a plurality of modules that are interfaceable with said core in order to achieve the first, second, third and fourth aircraft architecture respectively; and in that said core of each aircraft of said series further comprises:
 a pair of first portions of respective half-wings which are arranged on respective said first and second sidewall that are opposite to each other of said airframe and generating, in use, a first lift or downforce value; and
 a pair of second portions of respective aerodynamic surfaces arranged on respective said first and second sidewall that are opposite to each other and generating, in use, a second value of lift or downforce;
each said module comprising:
 respective third portions that are releasably connectable to respective first portions of corresponding said half-wings; and
 respective fourth portions that are connectable to respective second portions of corresponding said aerodynamic surfaces, so that said half-wings and aerodynamic surfaces are optimised according to the flight envelope that are characteristic of respective said first, second, third and fourth architecture;
said first and second portions defining respective root portions of the corresponding said half-wings and aerodynamic surfaces projecting cantilevered from respective sidewalls of said airframe;
said third and fourth portions defining respective free ends of the corresponding said half-wings and aerodynamic surfaces, and being arranged on the opposite side of the respective said first and second portions with respect to said airframes, proceeding according to corresponding directions of extension of said half-wings.

2. Series according to claim 1, characterized in that said second aerodynamic surfaces of each said aircraft are arranged anteriorly to said half-wings, with reference to a normal flight position of said aircraft arranged, in use, in a second configuration.

3. Series according to claim 1, characterized in that said core comprises:
- a fin which is arranged at a tail of said airframe; and
- a pair of third aerodynamic surfaces projecting cantilevered from respective said first and second sidewall of said fin and adapted to generate, in use, a third lift/downforce value.

4. Series according to claim 1, characterized in that said core of each aircraft comprises:
- a rechargeable electric power source; and
- a plurality of electric motors and operatively connected to said first, second, third, fourth, fifth and sixth rotor.

5. Series according to claim 4, wherein said aircraft is characterized in that said electric motors can be powered exclusively with said electric power source.

6. Series according to claim 4, characterized in that said module defines a hybrid propulsion system; said module comprising:
- a control unit;
- a first heat engine configured to generate a first mechanical power value;
- a second heat engine configured to generate a second mechanical power value greater than said first mechanical power value;
- first electric generators configured to generate a first electric power value, which are electrically selectively connected to said electric motors and operable by said first heat engine; and
- second electric generators configured to generate a second electric power value greater than said first value and electrically selectively connected with said electric motors and operable by said second heat engine;

said control unit being programmed to:
- electrically connect said second electric generators and said source to said electric motors, when said aircraft is arranged in a first configuration for a first time interval; or
- electrically connect said second and first electric generators and said source to said electric motors, when said aircraft is arranged in said first configuration for a second time interval greater than said first time interval.

7. Series according to claim 6, characterized in that said control unit is programmed to electrically connect said first engine to said electric generators and/or to recharge said electric power source, when said aircraft is arranged in a second configuration for a second time interval greater than said first time interval.

8. Series according to claim 6, characterized in that said control unit is programmed to electrically connect said electric power source to said electric motors in case of failure of one of said first and second heat engine.

9. Series according to claim 6, characterized in that said module defines a remotely piloted aircraft.

10. Series according to claim 9, characterized in that said module comprises a single first sub-module defining the entire payload and occupying the entirety of said compartment; and/or
characterized in that said module comprises a further rechargeable electric power source which is electrically connectable with said electric motors;
said control unit being configured to electrically connect said further electric power source to said electric motors, when said aircraft is arranged in said first configuration.

11. Series according to claim 10, characterized in that said module comprises at least a second sub-module occupying only a part of said compartment and housing said further electric power source.

12. Series according to claim 11, characterized in that said module comprises a third sub-module occupying the remaining part of said compartment; said sub-module comprising an electrical power supply socket for a utility of said aircraft; said power supply socket being accessible from the outside of said airframe.

13. Series according to claim 1, characterized in that said sixth and seventh axis are inclinable with respect to said airframe;
each said aircraft of said series being switchable between:
- a first hovering or take-off/landing flight configuration wherein said sixth and seventh axis are arranged orthogonal to said first axis; and
- a second forward flight configuration wherein said sixth and seventh axis are arranged parallel to or inclined with respect to said first axis.

14. Method for configuring an aircraft configurable in respective mutually distinct architectures based on the operational needs of the aircraft;
said aircraft comprising:
- a core that is common to all said architectures;
- an airframe defining a first longitudinal axis of said aircraft and defining a nose and a tail of said aircraft;
- a first and a second rotor which are rotatable, respectively, about a second and third axis which is fixed with respect to said airframe, and which are operable independently of each other so as to generate, respectively, a first and a second thrust value independent of each other;
- a third and a fourth rotor which are rotatable, respectively, about a fourth and fifth axis which is fixed with respect to said airframe, and which are operable independently of each other so as to generate, respectively, a third and a fourth thrust value independent of each other;
said second, third, fourth and fifth axis being parallel to each other;
said second and third axis being arranged respectively on the sides of a first and a second sidewall that are opposite to each other of said airframe symmetrically with respect to said first axis;
said fourth and fifth axis being arranged respectively on said sides of said first and second sidewall of said airframe symmetrically with respect to said first axis;
said aircraft further comprising:
- a fifth and a sixth rotor carried by respective half-wings, which are rotatable respectively about a sixth and a seventh axis, and operable independently of each other so as to generate respectively a fifth and a sixth thrust value independent of each other;

said sixth and seventh axis being arranged respectively on said sides of said first and second sidewall of said airframe symmetrically with respect to said first axis;

said aircraft further comprising:
- a pair of half-wings extending cantilevered from mutually opposite said first and second sidewalls and transversely of said first axis; and
- a pair of aerodynamic surfaces projecting cantilevered from mutually opposite sides of said nose;

characterized by comprising the step of connecting a module associated with a respective said architecture of said aircraft to said core;

said core of each aircraft of said series comprising at least:
- a pair of first portions of respective half-wings which are arranged on respective said first and second sidewall that are opposite to each other of said airframe and generating, in use, a first lift or downforce value; and
- a pair of second portions of respective aerodynamic surfaces arranged on respective said first and second sidewall that are opposite to each other of said airframe and generating, in use, a second lift or downforce value;

each said module comprising:
- respective third portions that are releasably connectable to respective first portions of corresponding said half-wings; and
- respective fourth portions that are connectable to respective second portions of corresponding said aerodynamic surfaces, so that said half-wings and aerodynamic surfaces are optimised according to the flight envelope that are characteristic of respective first, second, third and fourth architecture;

said first and second portions defining respective root portions of the corresponding said half-wings and aerodynamic surfaces projecting cantilevered from respective sidewalls of said airframe;

said third and fourth portions defining respective free ends of the corresponding said half-wings and aerodynamic surfaces, and being arranged on the opposite side of the respective said first and second portions with respect to said airframes, proceeding according to corresponding directions of extension of said half-wings.

* * * * *